Sept. 6, 1938.    H. W. LEVERENZ    2,129,096
LUMINESCENT MATERIAL AND METHOD OF PREPARING SAME
Filed Jan. 20, 1936    2 Sheets—Sheet 1
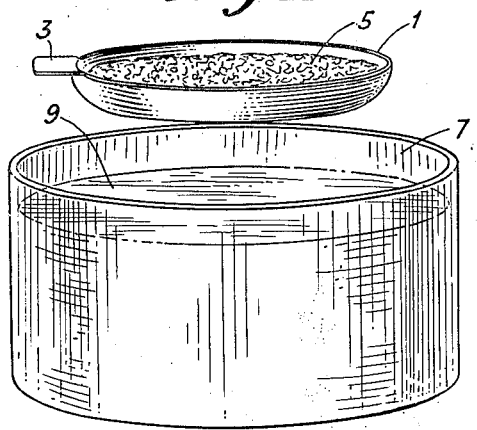
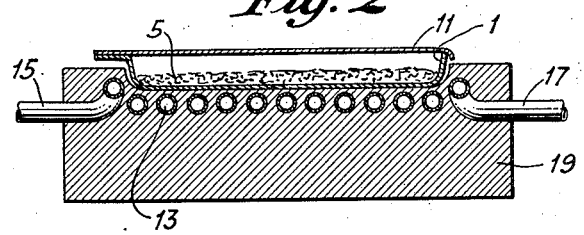
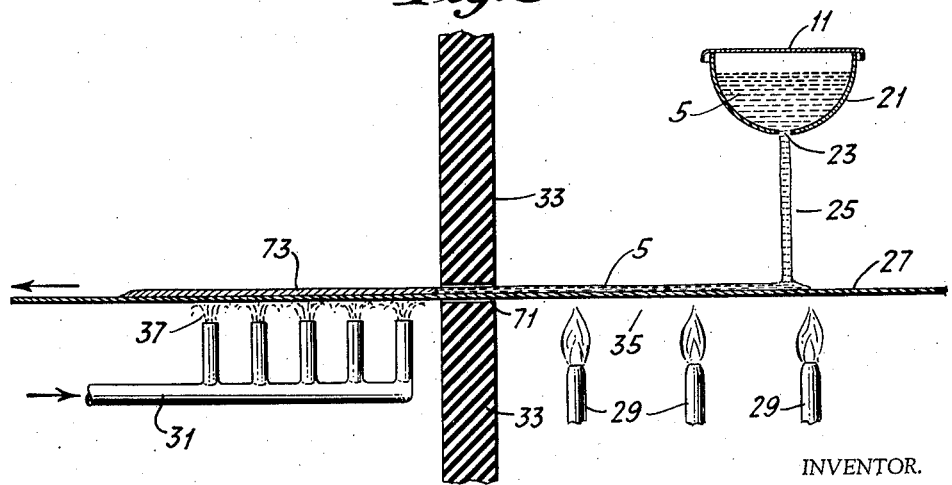
INVENTOR.
H. W. LEVERENZ
BY
ATTORNEY.

Sept. 6, 1938.   H. W. LEVERENZ   2,129,096
LUMINESCENT MATERIAL AND METHOD OF PREPARING SAME
Filed Jan. 20, 1936   2 Sheets-Sheet 2
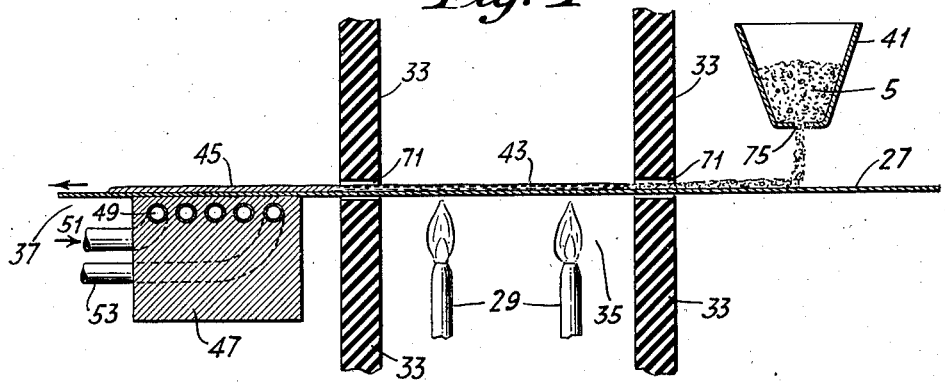
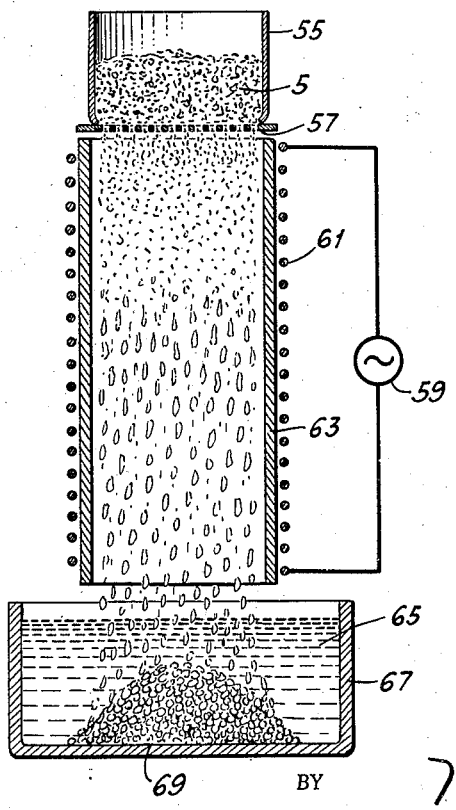
INVENTOR.
H. W. LEVERENZ
ATTORNEY.

Patented Sept. 6, 1938

2,129,096

UNITED STATES PATENT OFFICE 2,129,096

LUMINESCENT MATERIAL AND METHOD OF PREPARING SAME

Humboldt W. Leverenz, Collingswood, N. J., assignor to Radio Corporation of America, a corporation of Delaware Application January 20, 1936, Serial No. 59,883

4 Claims. (Cl. 134—47)

My invention relates to luminescent screens, and, in particular, to the preparation of improved luminescent materials for cathode ray tubes, X-ray tubes, and the like.

In the past luminescent materials for use, for example, in cathode ray tubes, have had many serious drawbacks. These drawbacks were of the nature of an unstable material which changed rapidly under excitation so that its usable life was very short. These older materials likewise were relatively inefficient as regards conversion of the impinging energy into light energy, and further had a very low resistance to burning when excited by cathode ray bombardment. My invention overcomes these objectional features of luminescent materials and provides new materials which are superior to any of those previously known.

Briefly, my method of preparing these improved luminescent materials is to heat the luminescent material to a temperature above its melting point, maintaining the temperature constant until the luminescent material is molten and then cooling the molten material at an exceedingly rapid rate and in such a fashion that essentially no temperature gradient is established through the material. That is to say that the mass of molten material is purposely made small compared to the cooling medium so that the change in temperature of each particle of molten material is practically instantaneous.

To carry out my method I have provided a number of methods and means which will be described in greater detail below.

The material resulting from this treatment will then be found to luminesce at longer wave lengths than previous to the treatment, and in addition, will have much better qualities, as resistance to burning, transparent crystals, etc., than the material had before the treatment. The important part of the process is to quickly drop the temperature of the molten material, thereby preserving any high temperature allotropic modifications which the process produces. In general, an expanded lattice results and the color of luminescence is shifted toward the longer wave lengths.

The method may be used, likewise, to prepare thin translucent sheets of phosphors.

The luminescing color of the luminescent material has not, in general, been under the control of the manipulator. That is to say, that if a luminescent material was prepared, its color was in general a function of the particular material, and the manipulator could not change this color. It is, accordingly, one of my main objects to provide an improved luminescent material in which control over the color of the radiating light is at the disposal of the manipulator.

Another of my objects is to provide a luminescent material having increased light conversion efficiency with a marked increase in stability.

Another of my objects is to provide a luminescent material having a long life against burning under cathode ray bombardment.

Another of my objects is to provide a luminescent material of transparent crystals or sheets so that better contrast between the excited and unexcited states of the luminescent material may be obtained and the screen efficiency increased.

Another one of my objects is to provide a luminescent material which possesses invariant spectral distribution under bombardment both as regards variations in intensity and time, as well as to provide a luminescent material which improves with use.

A further object is to provide an improved process of manufacturing luminescent materials.

Other ancillary objects will become apparent upon consideration of the invention which I have disclosed in the following specification, taken with the appended claims and the accompanying drawings, in which:

Fig. 1 shows the method of preparing luminescent material in accordance with my invention wherein a thin, shallow crucible is used;

Fig. 2 shows a modification of my invention as shown in Fig. 1;

Fig. 3 shows a modification of my invention where a heated apertured crucible is used;

Fig. 4 shows another modification of my invention using an apertured hopper; and Fig. 5 shows another modification of my invention wherein a vertical heated column is used.

In practicing my invention, I prefer to start with a material which already possesses excellent luminescent properties, such as manganese activated zinc ortho-silicate, which may be prepared in accordance with the method which I have outlined in my co-pending application, Serial No. 707,866, filed January 23, 1934, and entitled "Process for synthesizing luminescent material". To this material I have assigned the tentative formula $\alpha$—$Zn_2SiO_4.Mn$. This material luminesces very strongly in the region of 5200 Å. and produces a bright green color under the excitation of cathode rays, for example.

In one of the methods of preparing my improved material, I take a small quantity of this manganese activated zinc ortho-silicate and place it in a small, shallow platinum crucible, as shown in Fig. 1. This crucible is equipped with a tab 3 to facilitate the handling thereof. This small quantity of luminescent material is distributed over the bottom of the platinum crucible 1 to form a thin layer 5 not exceeding 5 millimeters in thickness. The crucible and contents are then heated by any appropriate means and preferably in an atmosphere of inert gases as is well known in the art, to a temperature in the vicinity of 1500 to 1600 degrees centigrade. This temperature and heating is maintained for some two to twenty minutes to allow the manganese activated zinc ortho-silicate to become molten. The crucible is then removed from the heating means, which may be, for example, an electric furnace and the platinum crucible spun around on the surface of cold water 9 contained in a beaker 7 so as to rapidly cool the molten material. Alternatively, the crucible 1 with the molten material 5 may be removed from the furnace and a blast of very cold air or cooling brine may be directed toward the bottom of the crucible to produce the quenching action or again, I may simply plunge the entire crucible and its contents into a container of ice-cold water to produce quenching. I have found that with the particular material described, i. e. manganese activated zinc ortho-silicate, that maintaining the molten state from three to six minutes and then allowing between two and ten seconds to elapse between the time of removal and quenching to produce optimum results in the final material.

Allowing a short time, as indicated, with an optimum value of four seconds to elapse before quenching the material, allows some super-cooling of the molten material to take place and has been found to yield the most constant results. Likewise cooling the crucible and its contents from the bottom as described above, is preferable, inasmuch as the resultant material has somewhat improved properties over the material produced by immersing the crucible and contents into the quenching liquid.

Where it is inconvenient to supply an inert atmosphere during the heating operation of the crucible and contents, a thin platinum sheet may be placed over the crucible and kept on during the entire process. As an alternative means of cooling the crucible, an arrangement such as shown in Fig. 2 may be used. In this figure the platinum crucible 1 containing the molten luminescent material 5 is shown with a thin platinum lid 11. The platinum crucible 1 rests on a large copper or other metallic block 19 of large heat capacity. Imbedded in the block and close to the upper surface thereof are a series of tubes 13 through which a refrigerant liquid may be passed through by means of the inlet 15 and led out through the outlet 17. The upper face of the block is machined so that its contour matches that of the platinum crucible closely in order to permit good thermal contact. This last step is necessary in order that effective transfer of heat from the crucible to the block may take place.

For large scale production it is obvious that the above described methods do not lend themselves to very great efficiency and consequently I have provided means and methods for expediting the treatment of luminescent materials in such a fashion to make large scale production feasible. One such method is shown in Fig. 3 where a container 21 is provided with a lid 11 and filled with a molten luminescent material 5. In the bottom of this container is an aperture 23 through which the molten material 5 flows in a stream 25 to meet a thin platinum strip 27. This strip may take the form of a continuous belt below which heat is applied. In Figure 3 I have shown the heated region 35 as being maintained at suitable temperature by means of gas flames 29. Obviously, however, any other heating means may be supplied such as an electric furnace. The temperature in this region is maintained between 1500° and 1600° C. The heating chamber has an opening 71 in the insulating walls 33 through which the platinum strip 27 carrying the molten material 5 may pass. Upon passing through the opening 71, the platinum strip runs over a number of jets 31 bearing the cooling fluid which produces the beta form of manganese activated zinc ortho-silicate 73 by quenching action. The cooling region 37 is preferably maintained at a temperature close to zero degrees C. Alternatively, this method may be modified as shown in Fig. 4, where a hopper 41 contains the luminescent material 5. The hopper is agitated by means well known in the art, so that the luminescent material is shaken out through the aperture 75 to fall on a thin platinum sheet 27 which sheet may be a continuous belt, as described above. The sheet bearing the luminescent material then passes into a heated chamber 35 through an opening 71.

The temperature in this heated region is maintained between 1500° and 1600° C. by means of gas flames, electric furnaces or other suitable heating means, and the rate of travel of the platinum sheet 27 is so adjusted that the luminescent material 5 has an opportunity to become molten and to be maintained in this state for an optimum time period as discussed above. The strip continues in its travel to pass through another insulating wall through an opening 71 into a cooling chamber 37 which may be of the same form as the cooling chamber shown in Fig. 2, or may take the form as shown in Fig. 4, where the cooling means is a large metallic block 47 in which tubes 49 are imbedded close to the upper surface thereof and said tubes being provided with an inlet 51 and an outlet 53 whereby a refrigerant liquid may be used to cool the entire block. The strip 27 is passed over the block and maintained in good thermal contact therewith to produce the desired quenching action and there results a thin translucent sheet 45 of the beta form of manganese activated zinc orthosilicate.

In another form, as shown in Fig. 5, a container 55 is provided with a sieve-like bottom 57. The luminescent material 5 is placed within the container. Below the container and in register with it is an electric furnace 63 which is heated inductively through the medium of the windings 61 and the radio frequency generator 59. The container 55 is mechanically agitated by any means well known in the art so as to sift out very fine particles of the luminescent material, the size of the particles, of course, being regulated by the mesh used as a sieve 57.

As the particles fall through the furnace whose temperature is maintained in the region of 1500° to 1600° C. they become molten. At the bottom of the vertical furnace is a container 67 in which ice cold water, for example, may be placed. The molten particles dropping into the cold water are quenched substantially instantaneously. When the required amount of material has been run through and the water 67 decanted, the accumulated material 69 is then dried and thus becomes ready for use. I have found from a long series of experiments that optimum conditions require the quenching action to take place from the bottom up of the material and to take place within one second. Sometimes a second heat treatment of melting and quenching of the batch of material is required to give 100% yield. This, apparently, is due to the fact that seed crystals from the first batch escape complete melting the second time.

The resultant quenched material will be found after this treatment to luminesce under the action of cathode rays with a brilliant yellow color whose wave length at maximum response is in the vicinity of 5660 Å. Furthermore, it will be found that this material has especially, resistance to burning under the bombardment of cathode rays and that its spectral position is invariant with intensity of bombardment and with the duration of bombardment. It furthermore affords an increased efficiency in converting cathode ray energy into light energy and provides, therefore, better contrast through the medium of transparent crystals produced. This material I have chosen to call "beta zinc ortho-silicate" ($\beta$—$Zn_2SiO_4.Mn$) in contradistinction to the original material with which I started, which I have called "alpha zinc ortho-silicate" ($\alpha$—$Zn_2SiO_4.Mn$).

While I have, for the purposes of illustration, cited the use of alpha manganese activated zinc ortho-silicate as the luminescent material to be treated and have further cited the optimum conditions for treating this material, I in no way limit myself to the preparation of only manganese activated zinc ortho-silicate by this method. This general method is applicable to all luminescent materials which exhibit a crystalline form upon quenching from the molten state.

Without departing from the spirit and scope of this invention, it will be apparent that other and various ways and means may be provided for melting and quenching the zinc ortho-silicate, and that other luminescent materials besides zinc ortho-silicate, which was mentioned as an example, may be similarly treated as above described, and I, therefore, believe myself in accordance with the modifications of this general method herein suggested, to be entitled to make and use any and all of those modifications which fall fairly within the spirit and scope of the invention as set forth by the appended claims.

What I claim is:

1. A crystalline synthetic manganese activated zinc ortho-silicate characterized by the fact that it luminesces under excitation of radiant energy with maximum spectral emission in the region between 5400 Å to 5800 Å.

2. The method of changing the emission spectrum of crystalline luminescent material having a predetermined lattice structure which comprises melting the said material and then substantially instantaneously quenching the melted material to produce a lattice structure different than the predetermined lattice structure of the crystalline material.

3. The method of making crystalline luminescent material, which comprises entraining centers of an activator substance in the crystal faults of a crystalline substance, giving thereby the characteristic of becoming luminescent upon excitation thereof, heating the crystalline substance to at least substantially its melting temperature, whereby the original crystal structure of said substance is dissolved, and quenching substantially instantaneously the molten material to produce crystalline luminescent material whose lattice structure is different than the lattice structure of the first named luminescent material.

4. The method of changing the emission spectrum under irradiation of radiant energy of a crystalline luminescent material which also exhibits crystalline form upon quenching from the molten state, comprising the steps of heating the crystalline luminescent material until molten, and cooling the molten material at such a high rate to expand the lattice structure compared to the lattice structure of the original material without change in chemical composition.

HUMBOLDT W. LEVERENZ.